US009024945B2

(12) United States Patent
McClure

(10) Patent No.: US 9,024,945 B2
(45) Date of Patent: May 5, 2015

(54) SYSTEM AND METHOD FOR OPTICAL THREE-DIMENSIONAL PARTICLE LOCALIZATION

(71) Applicant: Jason McClure, Leominster, MA (US)

(72) Inventor: Jason McClure, Leominster, MA (US)

(73) Assignee: Roper Scientific, Inc., Tucson, AZ (US)

( * ) Notice: Subject to any disclaimer, the term of this patent is extended or adjusted under 35 U.S.C. 154(b) by 19 days.

(21) Appl. No.: 13/734,438

(22) Filed: Jan. 4, 2013

(65) Prior Publication Data

US 2014/0192042 A1    Jul. 10, 2014

(51) Int. Cl.
*G06T 13/20*    (2011.01)
*G02B 21/16*    (2006.01)
*G02B 21/36*    (2006.01)

(52) U.S. Cl.
CPC .............. *G02B 21/16* (2013.01); *G02B 21/367* (2013.01)

(58) Field of Classification Search
None
See application file for complete search history.

(56) References Cited

U.S. PATENT DOCUMENTS 8,693,742 B2    4/2014  Piestun et al.
2011/0249866 A1  10/2011  Piestun et al.

OTHER PUBLICATIONS

Huang, et al., "Three-Dimensional Super-Resolution Imaging by Stochastic Optical Reconstruction Microscopy", Science Magazine, vol. 319, Feb. 8, 2008, pp. 810-813.
Zhuang, et al., "Photoswitching Mechanism of Cyanine Dyes", J. Am. Chem. Soc. 2009, 131, 18192-18193.

*Primary Examiner* — Said Broome
(74) *Attorney, Agent, or Firm* — Caesar, Rivise, Bernstein, Cohen & Pokotilow, Ltd.

(57) ABSTRACT

Embodiments include methods that may be used to optically obtain the precise three-dimensional location of multiple objects from one or more two dimensional images. An optical point spread function having a transverse shape which varies with axial distance may be implemented to obtain depth information. The transverse variation in the PSF with depth may be produced using a cylindrical lens. The objects may be imaged by a focal plane array detector. One or more 2D images may be used to find the 3D location of the objects using sparse signal reconstruction methods.

8 Claims, 4 Drawing Sheets

SYSTEM AND METHOD FOR OPTICAL THREE-DIMENSIONAL PARTICLE LOCALIZATION

FIELD OF THE INVENTION

The present invention generally relates to methods for precise localization of objects in a three dimensional space from one or more two-dimensional images. More specifically, some embodiments relate to methods for enhancing the speed at which 3D images can be generated by reducing the number of required 2D images.

BACKGROUND OF THE INVENTION

Fluorescence microscopy is a mature and widely used tool for studying biological systems at the microscopic level. Due to the diffraction of light, all fluorescence microscopy techniques are limited to a lateral resolution of approximately 250 nm as given by 0.61*lambda/NA, where lambda and NA refer to the wavelength of light and numerical aperture of microscope objective. However, there exist many biological features comprised of structures significantly smaller than 250 nm requiring a resolution that exceeds the diffraction limit. Single molecule localization microscopy (SMLM) represents one such exemplary method for achieving sub-diffraction limited resolution. Two closely related variants of SMLM include STochastic Optical Reconstruction Microscopy (STORM) and Photo-Activated Localization Microscopy (PALM). All SMLM techniques function similarly whereby an image of a sparse subset of photochemically activated fluorophores is collected and subsequent localization of each fluorophore performed by fitting a suitable point spread function to each observed Any disk. Activated fluorophores are then photochemically deactivated or switched from the emissive (active) to dark (inactive) state and back again to the emissive state. This defines one switching cycle of the fluorophore which is performed repeatedly until a large enough number of fluorophores has been imaged and localized to yield the desired spatial resolution of the final image. Typical lateral fluorophore localization accuracy is on the order of 25 nm which ultimately allows for a final image spatial resolution of approximately 50 nm.

All SMLM techniques are predicated on three requirements. First, fluorophores used to image the sample must be of the group comprising those which are capable of blinking. That is, they must be capable of transitioning between emissive and dark states under typical laboratory conditions. Secondly, the population distribution of emissive to dark fluorophores must be controllable via some means. Typically this is accomplished photochemically through the use of two lasers operating a different wavelengths; one to quench fluorescence and the other to activate the emissive state. Lastly, all SMLM techniques rely on the ability to efficiently localize the emitting fluorophores to a high degree of precision and accuracy. It is the last of these three requirements that is the focus of this disclosure.

Despite the advantages SMLM brings to the researcher, most organelles and cellular structures cannot be fully resolved without high-resolution along all three dimensions. Historically, 3D microscopy is performed using a scanning confocal microscope, however, lateral and axial resolution are then again limited by diffraction effects. Extending the capabilities of SMLM techniques to the third, axial, dimension overcomes these problems. Various techniques have previously been reported that allow for 3D SMLM (Huang et al. Science Vol 319; Piestun and Quirin US 2011/0249866 A1).

3D SMLM techniques rely on optically modifying the point spread function (PSF) of the microscope in such a manner that introduces a transverse variation that changes predictably and rapidly with axial displacement. One such method is to incorporate a cylindrical lens into the optical path of the microscope which introduces transverse astigmatism aberration into the PSF. A two dimensional elliptical Gaussian function with variable transverse widths may be used to model the aberrated PSF and extract depth information.

SMLM requires thousands of images to be acquired in order to generate a sufficient number of localization points so that the final reconstructed image may have adequate spatial resolution. This restricts the temporal resolution of any SMLM technique to the time required to localize enough fluorophores such that the distance between any two adjacent localized points is less than half the distance of the desired spatial resolution. The only two ways of improving temporal resolution are by increasing the rate at which fluorophores are switched from the active to inactive state or by increasing the number density of activated fluorophores in a given image. Increasing the fluorophore switching rate requires higher activation laser energy and results in increased photodamage to the sample. Increasing the number density of activated fluorophores per image leads to significant overlap of fluorescent spots (Airy disks) which, when using previously disclosed methods (Piestun), results in decreased localization accuracy and ultimately a degradation in the final image's spatial resolution.

This disclosure is directed to improving the speed of fluorophore localization in SMLM techniques in three dimensions by allowing significantly greater number density of activated fluorophores per image while maintaining high localization precision and accuracy

SUMMARY OF THE INVENTION

An embodiment of the invention comprises a method for localizing an object containing an ensemble of light-switchable elements in three-dimensional space. The method includes the steps of: causing a first sparse subset of the elements to illuminate; acquiring a first image b having dimensions $m^{(1/2)} \times m^{(1/2)}$ of the activated first sparse subset through optics having a point spread function (PSF) that varies predictably with axial object distance; causing the first sparse subset of the elements to extinguish; repeating the previous three steps for different sparse subsets of elements; defining a sensing array $\Phi = m \times n \times l$ which represents a discrete set of possible PSF's that any of the elements can generate within a given volume having dimensions $n^{(1/2)} \times n^{(1/2)} \times l$; and creating a three dimensional image of the elements by solving the following linear programming problem:

$$\min \Sigma_l \|x_l^n\|_1 \text{ subject to } \|\Sigma_l(\Phi_l^{mnl} x_l^n) - b^m\|_2 \leq \epsilon (\Sigma_m b_m^m)^{1/2}$$
$$\text{and } x_l^n \geq 0,$$

where: x=l-many n×1 image vectors comprising said $n^{(1/2)} \times n^{(1/2)} \times l$ three dimensional volume and $\epsilon$=user set tolerance on convergence.

In a further embodiment of this invention, a plurality of said sensing arrays are processed simultaneously.

In a further embodiment, a method for localizing an object containing an ensemble of light-switchable elements in three-dimensional space includes the steps of: causing a first sparse subset of the elements to illuminate; acquiring a first image b having dimensions $m^{(1/2)} \times m^{(1/2)}$ of the activated first sparse subset through optics having a point spread function (PSF) that varies predictably with axial object distance; causing the first sparse subset of the elements to extinguish; repeating the previous three steps for different sparse subsets of elements; defining a sensing array $\Phi = m \times n \times l$ which represents a discrete set of possible PSF's that any of the elements can generate within a given volume having dimensions $n^{(1/2)} \times n^{(1/2)} \times l$; and creating a three dimensional image of the elements by solving the following linear programming problem:

$$\min \sum_l c_l^{nT} x_l^n \text{ subject to } \left\| \sum_l (\Phi_l^{mnl} x_l^n) - b^m \right\|_2 \le \varepsilon \left( \sum_m b_b^b \right)^{1/2}$$

and $x_l^n \ge 0$, where: x=l-many n×1 image vectors comprising said $n^{(1/2)} \times n^{(1/2)} \times l$ three dimensional volume, $\epsilon$=user set tolerance on convergence and weighting factors are defined for n-many transverse locations each of said elements can occupy for each axial plane l, and wherein the weighing factors are represented by the equation $$c_l^n = \frac{1}{\max \left( \begin{bmatrix} \phi^{11l} + \phi^{21l} + \ldots \phi^{m1l} \\ \vdots \\ \phi^{1nl} + \phi^{2nl} + \ldots \phi^{mnl} \end{bmatrix} \right)} \begin{bmatrix} \phi^{11l} + \phi^{21l} + \ldots \phi^{m1l} \\ \vdots \\ \phi^{1nl} + \phi^{2nl} + \ldots \phi^{mnl} \end{bmatrix}$$

In a further embodiment shown in FIG. 3, the invention comprises a system for creating an image of an object 305 comprising an ensemble of light-switchable elements (not shown), the system includes: an image sensor 310; optics (320 having a point spread function (PSF) that varies predictably with axial object distance; an energy source 330; and a computer 340; wherein the computer: controls the energy source to illuminate a first portion of the light-switchable elements; controls the image sensor to acquire a first image of the light-switchable elements; controls the energy source to illuminate a second portion of the light-switchable elements; controls the image sensor to acquire a second image of the light-switchable elements; defines a sensing array $\Phi = m \times n \times l$ FIG. 4, element 410 which represents a discrete set of possible PSF's that any of said elements can generate within a given volume having dimensions $n^{(1/2)} \times n^{(1/2)} \times l$; and creates a three dimensional image of the elements by solving the following linear programming problem:

$$\min \Sigma_l \|x_l^n\|_1 \text{ subject to } \|\Sigma_l (\Phi_l^{mnl} x_l^n) - b^m\|_2 \le \varepsilon (\Sigma_m b_m^m)^{1/2}$$
and $x_l^n \ge 0$, where: x=l-many n×1 image vectors comprising said $n^{(1/2)} \times n^{(1/2)} \times l$ three dimensional volume and $\epsilon$=user set tolerance on convergence. FIG. 4, elements 430, 431 and 432 represent l=3 $n^{(1/2)} \times n^{(1/2)}$ image planes.

In a further embodiment of the system, the defining of the sensing array, the creating of the three dimensional image and the solving are performed on a field programmable gate array.

In a further embodiment of the system, the optics include a cylindrical lens.

BRIEF DESCRIPTION OF THE DRAWINGS

The accompanying drawings, which are incorporated herein and constitute a part of this specification, illustrate embodiments of the invention and together with the description server to explain the principals of the invention.

In the drawings.

DETAILED DESCRIPTION OF THE INVENTION

Figure 1:
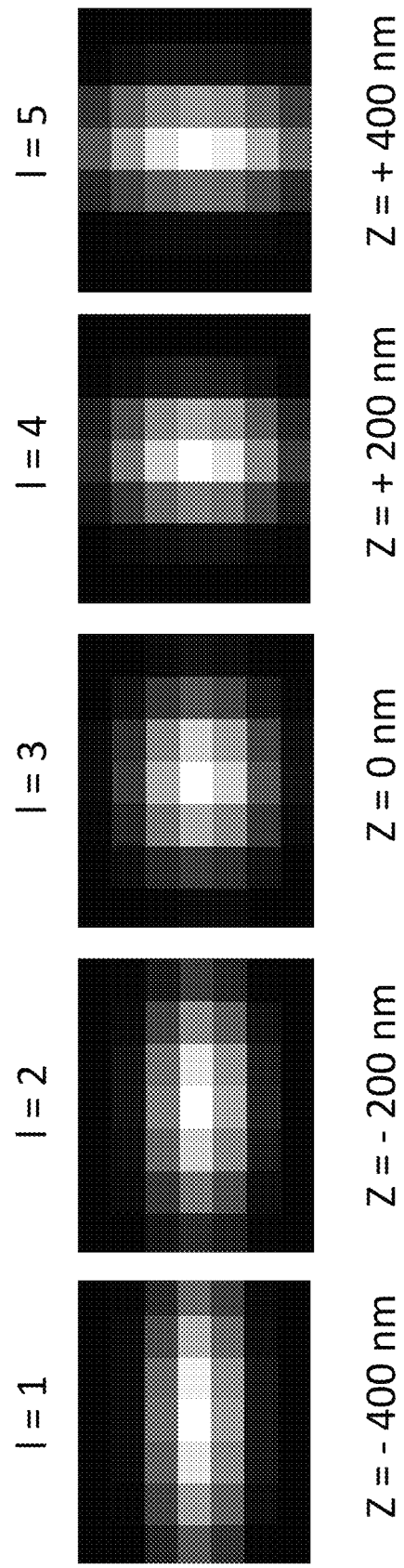
FIG. 1 is an illustration of an exemplary ranging point spread function making use of transverse astigmatism to give axial displacement information.

The present invention generally relates to three dimensional (3D) localization of objects. In one aspect, the invention is directed to determining the precise 3D locations of a sparse subset of objects imaged from a larger ensemble of similar objects. The precise 3D locations of said objects are determined by exploiting the a priori known sparseness of the imaged subset using a novel localization method. The exemplary localization method disclosed requires only that the imaged subset be a sparse representation of a much larger ensemble of similar objects and that some aspect of the imaging system produce a transverse variation or optical aberration that varies predictably with each object's axial location. For example, sparse subsets of objects may be imaged using an optical system that possess the property of having a point spread function (PSF) that varies predictably with axial object distance. The use of a cylindrical lens to produce transverse astigmatism aberration that varies predictably with axial object location is an example. A series of sequential sparse images may be collected and the 3D locations of all localized objects summed to form a single composite 3D image of the complete ensemble. Other aspects of the invention include systems for employing the exemplary object localization method, computer programs and/or firmware programs, and the like to execute the localization method.

In various aspects of the invention, any object able to emit or reflect light in a switchable manner may be used. The object may be a single molecule, fluorescent dye, metal nano-particle, semiconductor nano-particle or "quantum-dot". As used herein, the term "light" generally refers to electromagnetic radiation, having a wavelength and complementary frequency. In some embodiments, the light may include the visible portion of the electromagnetic spectrum (for example, having a wavelength between 400 nm and 700 nm, i.e., "VIS"), infrared wavelengths (for example, having wavelengths between 700 nm and 50 micrometers, "IR"), ultraviolet wavelengths (for example, having wavelengths between 10 nm and 400 nm, "UV"), and x-ray wavelengths (for example, having wavelengths less than 10 nm, "X-RAY").

As an example, the object may be a fluorescent dye molecule. It is known that certain fluorescent dye molecules, such as cyanine, may be sparsely activated, that is, controllably made to emit light whilst the larger ensemble of dye molecules remain in a dark or inactive state (Zhaung et. al., J. Am. Chem. Soc., 131, 18192-18193, 2009). Such an example is non-limiting as any sparse subset of objects part of a larger ensemble of similar objects which can be made to emit or reflect light will suitably work.

In the forgoing discussion, hypothetical system configurations are discussed for illustrative purposes and should not be taken as limiting the scope and spirit of invention.

Defining a Ranging PSF

The disclosed invention can use any optical PSF that exhibits a transverse variation that changes predictably with axial displacement. Such a PSF may be called a ranging PSF. For example, the introduction of a cylindrical lens near the back focal plane of an otherwise optically corrected microscope objective will introduce astigmatism aberration that will vary with the location of the object plane. Equation 1 may be used to model such a PSF.

$$f(x, y) = I e^{\left(-2\left(\frac{x-x_0}{\sigma_x^2}\right)-2\left(\frac{y-y_0}{\sigma_y^2}\right)\right)} \quad \text{Equation 1}$$

In Equation 1, 'I' refers to the peak intensity and is defined such that the PSF has unit area. The width of the PSF in the two transverse directions x,y are defined by $\sigma_x$ and $\sigma_y$ respectively. The centroid or lateral position of the PSF is defined by $x_0$ and $y_0$.

The transverse widths of the PSF defined by Equation 1 will vary with axial displacement 'z', orthogonal to both the x and y directions, in a predictable manner as given by Equation 2 where $\sigma_0$, $\delta$, and DOF are respectively the unaberrated PSF width as given by diffractive effects, separation between tangential and sagittal focal planes, and microscope objective depth of focus respectively.

$$\sigma_x(z) = \sigma_0 \sqrt{1 + \left(\frac{z-\delta}{DOF}\right)} \quad \text{Equation 2.1}$$

$$\sigma_y(z) = \sigma_0 \sqrt{1 + \left(\frac{z+\delta}{DOF}\right)} \quad \text{Equation 2.2}$$

FIG. 1 shows how a ranging PSF making use of transverse astigmatism gives rise to axial displacement information. The PSFs in FIG. 1 are generated by evaluating Equation 1 over a 7×7 pixel mesh grid using typical laboratory values for $\sigma_0$, $\delta$, and DOF for a 100× magnification objective. The axial dimension 'z' is varied from −400 nm to +400 nm in 200 nm steps.

Exemplary Localization Method

Once a ranging PSF is defined, a sensing array $\Phi(R^{mnl})$ is constructed which represents a discrete set of possible PSFs that any particle or fluorophore can generate within a given volume element. Mathematically, one may envision $\Phi$ as a collection of l-many m×n (row by column) matrices existing in the real number space $R^{mnl}$. The volume element bounded by the $\Phi$ array may have a transverse dimension in x and y as small as that which contains 99% of the integrated intensity of a single PSF or as large a transverse dimension as the recorded image. In the axial 'z' direction, the volume element bounded by $\Phi$ may have an axial dimension that is any value within the span of microscope's DOF. The dimensionality of the $\Phi$ array is then determined by considering the size of the bounding volume element and the transverse and axial sampling densities '$d_{xy}$' and '$d_z$' of said volume element. Defining a $\Phi$ which represents a smaller volume element than the total volume of imaged object space is advantageous as it allows for parallel processing of all volume elements simultaneously.

To illustrate, assume a sensing volume element that has equal transverse x and y widths of 1.6 micrometers and an axial z depth of 800 nm. If the microscope objective's magnification is 100× and the imaging detector's pixels are 16 micrometers on a side, then each detector pixel spans 160 nanometers of object space. Therefore, a 10×10 area of detector pixels is required to sample the raw 2D scene. This 2D scene may be vectorized mathematically by arranging each element, value in each detector pixel, into an m×1 column vector where, in this case, m=$10^2$=100. The vectorized raw 2D scene is called the observation vector 'b' and its dimensionality 'm' represents the first dimension in $\Phi$.

Further assume that the required sampling density in the transverse plane, $d_{xy}$, is to be that which results in a 20 nm transverse localization precision of any imaged particle. That requires a sampling density $d_{xy}$=(160 nm/pixel)/20 nm=8. The 'n' dimension of $\Phi$ is correlated to the total number of possible transverse locations in which a particle or fluorophore may localized. Therefore, n=m*$(d_{xy})^2$=100*$8^2$=6400.

Finally, the 'l' dimension of $\Phi$ is correlated to the number of axial sections required to achieve a given depth localization resolution. If the axial resolution requirement in z is 50 nm, then axial sampling density $d_z$=z depth/axial resolution=800 nm/50 nm=16 where l=$d_{z+}$1. As illustrated in FIG. 1, l=5 and the total axial sensing distance is 800 nm, however, sampled in 200 nm increments, from −400 nm to +400 nm. Each dimension in 'l' then correlates to a given distance in z above '+' or below '−' the focal plane.

In the present example, l=17 which gives 50 nm sampling increments from −400 nm to +400 nm. A given z depth above or below the focal plane is then addressed by the respective dimension in 1. That is, for l=1:z=−400 nm, l=9, z=0:l=17 z=+400 . . . etc.

Populating the elements of the $\Phi$ array is done by evaluating Equation 1 over a $m^{(1/2)} \times m^{(1/2)}$ grid for every n transverse and l axial location comprising the volume element bounded by $\Phi$, vectorizing the results, and placing the n-many m×1 column vectors in $\Phi$, for every l. For example, consider l=1 which gives z=−400 nm. Equations 2.1 and 2.2 are evaluated for z=400 giving unequal widths $\sigma_x$ and $\sigma_y$. These profile widths are then used in evaluating Equation 1 over a $m^{(1/2)} \times m^{(1/2)}$ grid which is then transformed into an m×1 vector. For every n column in the $\Phi^{mnl}$ array, a new m×1 vector is generated and placed into $\Phi$ at the respective $n^{th}$ column location. This is then repeated for all l in $\Phi$.

Equation 3 depicts how the $\Phi$ array looks in matrix form for a given value of l. Indexing a particular value of l in $\Phi$ returns an m×n two dimensional matrix containing the discrete set of all PSF's for a given axial location. Mathematical operations on m×n matrices extracted from the $\Phi$ array for a given l follow conventional mathematical formalism.

$$\Phi^{mnl} = \begin{bmatrix} \phi^{111} & \cdots & \phi^{1n1} \\ \vdots & \ddots & \vdots \\ \phi^{m11} & \cdots & \phi^{mn1} \end{bmatrix} \quad \text{Equation 3}$$

The resultant 3D image is determined by solving the following linear programming problem.

$$\min \sum_l c_l^{nT} x_l^n \quad \text{Equation 4}$$

$$\text{subject to } \left\| \sum_l (\phi_l^{mnl} x_l^n) - b^m \right\|_2 \leq \varepsilon \left( \sum_m b_m^m \right)^{1/2}$$

and $x_l^n \geq 0$

Where:
x=l-many n×1 image vectors comprising the $n^{(1/2)} \times n^{(1/2)} \times l$ 3D volume element.
b=m×1 observation vector acquired from camera
$\Phi$=m×n×l sensing array
$\varepsilon$=user set tolerance on convergence Equation 4 reads, minimize the ell-1 norm ($\|\ \|_1$) of the sum over l-many n×1 vectors x subject to the ell-2 norm ($\|\ \|_2$) of the sum $\Sigma_l(\Phi_l^{mnl}x_l^n)-b^m$ begin less than or equal to a user defined threshold $\epsilon$ times the sum over all elements in the raw observation vector 'b' and subject to all elements in all x vectors being greater than or equal to 0. The term, $(\Sigma_m b_m)^{1/2}$, is a measure of the Poisson noise in the observation vector or raw 2D image and $\epsilon$ is typically set to values ranging from 1-3. Superscripts in Equation 4 indicate the dimensionality of the respective term and subscripts indicate dimensions that are being summed over or indicate how many of a given vector or matrix there are. For example, x is an n×1 column vector and there are l-many of them. The ell-1 norm is computed for each x vector which results in l-many scalars which are summed to give a scalar result which is then minimized.

The above minimization problem falls into the class of linear convex programming and can be solved by various means. One skilled in the art would identify 10's of methods capable of solving the above minimization problem. Various alternative known ways in which this is done are omitted from this disclosure.

Solving the linear programming problem given by Equation 4 results in l-many n×1 'x' vectors that are then re-gridded to form a resulting $n^{(1/2)} \times n^{(1/2)} \times l$ 3D image sampled $d_{xy}$ times finer in each transverse dimension than the original image and stratified $d_z$ times in the axial dimension. Equation 4 is then solved repeatedly many times over new observation vectors 'b' and the resulting x vectors are summed forming an aggregate 3D image having the desired sub-diffraction limited resolution.

The exemplary localization method allows the number density of activated fluorophores in a given volume element to exceed previously disclosed methods while maintaining high 3D localization accuracy. This happens by minimizing the ell-1 norm of the resultant 3D image which effectively performs a global search over the bounding volume element for the sparsest representation that is explained by the observation vector when considering the sensing matrix $\Phi$. Allowing for a greater number density in activated fluorophores in each observation vector results in a substantial decrease in the total number of images required to generate the final aggregate 3D image and enhances the temporal resolution of such techniques.

The linear programming problem given by Equation 4 can be further tailored to meet the needs of specific experimental conditions. For example, statistical weighting factors $c_l^n$ can be introduced to scale both $\Phi$ and/or the resulting image vectors 'x'. Individual weighting factors may be defined for the n-many transverse locations a particle can occupy for each axial plane l by summing over all rows in $\Phi$ and dividing by the maximum summed value. This may be represented by the l-many n×1 vectors $c_l^n$ given by Equation 5.

$$c_l^n = \frac{1}{\max\left(\begin{bmatrix} \phi^{11l} + \phi^{21l} + \ldots \phi^{ml l} \\ \vdots \\ \phi^{1nl} + \phi^{2nl} + \ldots \phi^{mnl} \end{bmatrix}\right)} \begin{bmatrix} \phi^{11l} + \phi^{21l} + \ldots \phi^{ml l} \\ \vdots \\ \phi^{1nl} + \phi^{2nl} + \ldots \phi^{mnl} \end{bmatrix} \quad \text{Equation 5}$$

The linear program given by Equation 4 may then be written as Equation 6 where the l-many n×1 statistical weight vectors $c_l^n$ are now incorporated. The superscript 'T' in $c_l^{nT}$ indicates the transpose of the l-many n×1 column vectors to 1×n row vectors then followed by vector multiplication by the l-many n×1 x vectors. The sum is then carried out over all l and the scalar result minimized.

$$\min \sum_l c_l^{nT} x_l^n \quad \text{Equation 6}$$
$$\text{subject to } \left\|\sum_l (\phi_l^{mnl} x_l^n) - b^m\right\|_2 \le \epsilon \left(\sum_m b_m^m\right)^{1/2}$$
$$\text{and } x_l^n \ge 0$$

Figure 2:
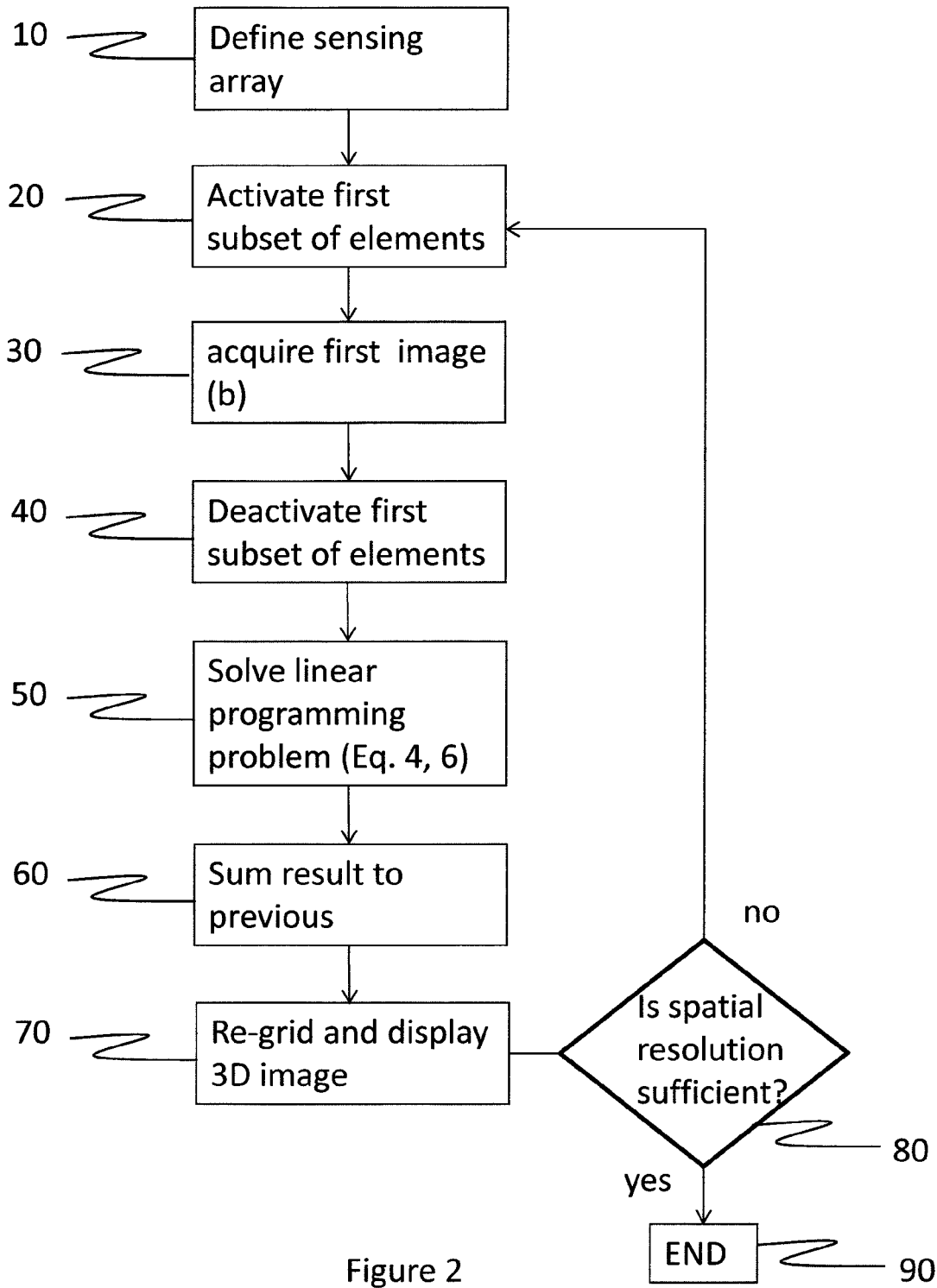
FIG. 2 is a process diagram of an exemplary method for localizing an object.
Figure 3:
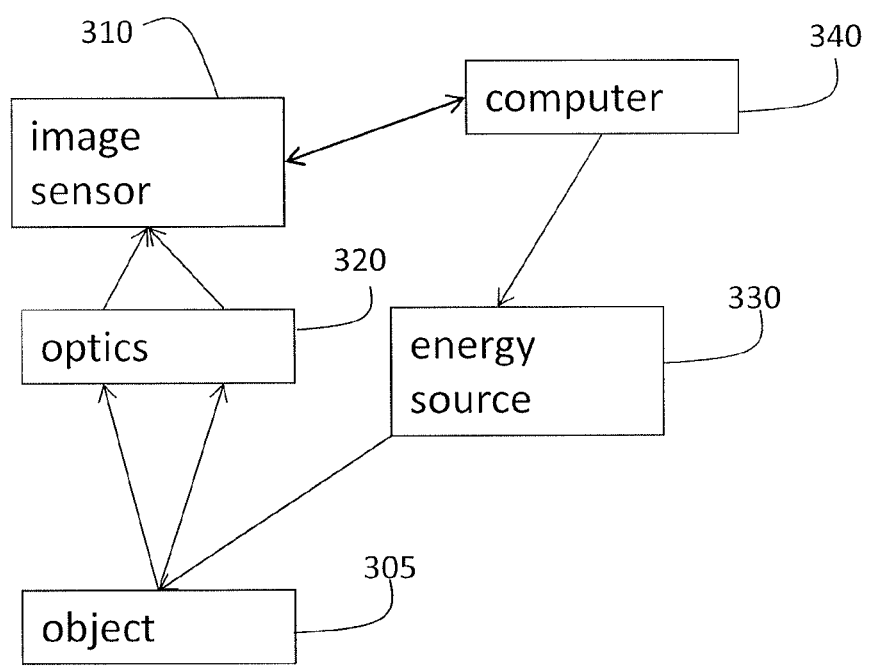
FIG. 3 is a diagram of an exemplary system for object localization.
Figure 4:
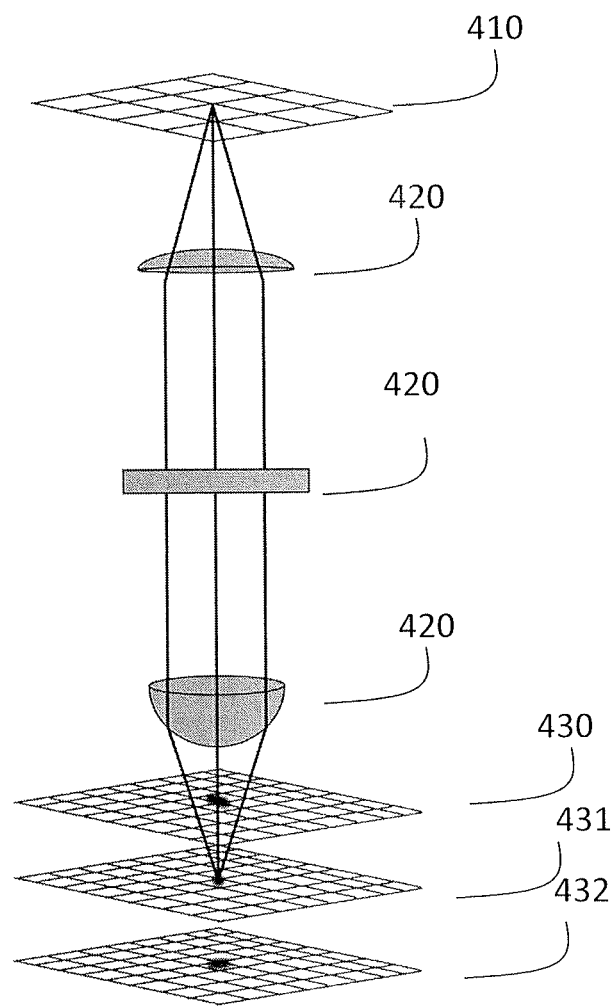
FIG. 4 is a diagram showing three $n^{(1/2)} \times n^{(1/2)}$ image planes and a sensing array.

FIG. 2 shows an exemplary process diagram for the methods described above. At step 10, a sensing array $\Phi$=m×n×l is defined, which represents a discrete set of possible PSF's that any of said elements can generate within a given volume having dimensions $n^{(1/2)} \times n^{(1/2)} \times l$. At step 20, a first sparse subset of light switchable elements is caused to be illuminated. This can be by various means, as described more fully above. At step 30, a first image b having dimensions $m^{(1/2)} \times m^{(1/2)}$ of said activated first sparse subset is acquired through optics having a point spread function (PSF) that varies predictably with axial object distance. At step 40, the first spare subset of elements is extinguished. At step 50, the linear programming problem of either Equation 4 or 6 is solved to create a three dimensional image of the light-switchable elements. At step 60, the solution to the linear programming problem obtained in step 50 is added to the previous solution. At step 70, the aggregate solution vector x is re-gridded into an $n^{(1/2)} \times n^{(1/2)} \times l$ 3D image and displayed to the user. Decision point 80 determines if the spatial resolution of the aggregate 3D image is sufficient. If the spatial resolution is not sufficient, steps 20-70 are repeated. Once sufficient spatial resolution is achieved, step 90 terminates image acquisition.

The foregoing description and drawings should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. A method for localizing an object containing an ensemble of light-switchable elements in three-dimensional space comprising the steps of:

causing a first sparse subset of the elements to illuminate;

acquiring a first image b having dimensions $m^{(1/2)} \times m^{(1/2)}$ of said activated first sparse subset through optics having a point spread function (PSF) that varies predictably with axial object distance;

causing said first sparse subset of the elements to extinguish;

repeating the previous three steps for different sparse subsets of elements;

defining a sensing array $\Phi$=m×n×l which represents a discrete set of possible PSF's that any of said elements can generate within a given volume having dimensions $n^{(1/2)} \times n^{(1/2)} \times l$; and creating a three dimensional image of said elements by solving the following linear programming problem:

$$\min \Sigma_l \|x_l^n\|_1 \text{ subject to } \|\Sigma_l(\Phi_l^{mnl}x_l^n)-b^m\|_2 \leq \epsilon(\Sigma_m b_m^m)^{1/2}$$
$$\text{and } x_l^n \geq 0,$$

where: x=l-many n×1 image vectors comprising said $n^{(1/2)} \times n^{(1/2)} \times l$ three dimensional volume and ϵ=user set tolerance on convergence and where: m is the number of pixels in each image b, n is the total number of possible transverse locations in which a light-switchable element may localized and l is the number of planes of images.

2. The method of claim 1, further comprising processing simultaneously a plurality of said sensing arrays.

3. The method of claim 1, wherein each of said steps is repeated to create a plurality of results, and further comprising summing said results.

4. A method for localizing an object containing an ensemble of light-switchable elements in three-dimensional space comprising the steps of:

causing a first sparse subset of the elements to illuminate;

acquiring a first image b having dimensions $m^{(1/2)} \times m^{(1/2)}$ of said activated first sparse subset through optics having a point spread function (PSF) that varies predictably with axial object distance;

causing said first sparse subset of the elements to extinguish;

repeating the previous three steps for different sparse subsets of elements;

defining a sensing array Φ=m×n×l which represents a discrete set of possible PSF's that any of said elements can generate within a given volume having dimensions $n^{(1/2)} \times n^{(1/2)} \times l$; and creating a three dimensional image of said elements by solving the following linear programming problem:

$$\min \sum_i c_i^{nT} x_i^n$$

$$\text{subject to } \left\| \sum_i (\Phi_1^{mnl} x_1^n) - b^m \right\| \leq \varepsilon \left( \sum_m b_m^m \right)^{1/2}$$

$$\text{and } x_l^n \geq 0,$$

where: x=l-many n×1 image vectors comprising said $n^{(1/2)} \times n^{(1/2)} \times l$ three dimensional volume, where: m is the number of pixels in each image b, n is the total number of possible transverse locations in which a light-switchable element may localized and l is the number of planes of images, ϵ=user set tolerance on convergence and weighting factors are defined for n-many transverse locations each of said elements can occupy for each axial plane l, and wherein said weighing factors are represented by the equation $$c_l^n = \frac{1}{\max\left(\begin{bmatrix} \phi^{11l} + \phi^{21l} + \dots \phi^{m1l} \\ \vdots \\ \phi^{1nl} + \phi^{2nl} + \dots \phi^{mnl} \end{bmatrix}\right)} \begin{bmatrix} \phi^{11l} + \phi^{21l} + \dots \phi^{m1l} \\ \vdots \\ \phi^{1nl} + \phi^{2nl} + \dots \phi^{mnl} \end{bmatrix}.$$

5. The method of claim 4, wherein each of said steps is repeated to create a plurality of results, and further comprising summing said results.

6. A system for creating an image of an object comprising an ensemble of light-switchable elements, the system comprising:

an image sensor;

optics having a point spread function (PSF) that varies predictably with axial object distance;

an energy source; and a computer; wherein said computer: controls said energy source to illuminate a first portion of said light-switchable elements; controls said image sensor to acquire a first image of said light-switchable elements; controls said energy source to illuminate a second portion of said light-switchable elements; controls said image sensor to acquire a second image of said light-switchable elements and defines a sensing array Φ=m×n×l which represents a discrete set of possible PSF's that any of said elements can generate within a given volume having dimensions $n^{(1/2)} \times n^{(1/2)} \times l$; and creates a three dimensional image of said elements by solving the following linear programming problem:

$$\min \Sigma_l \|x_l^n\|_1 \text{ subject to } \|\Sigma_l(\Phi_l^{mnl}x_l^n)-b^m\|_2 \leq \epsilon(\Sigma_m b_m^m)^{1/2}$$
$$\text{and } x_l^n \geq 0,$$

where: x=l-many n×1 image vectors comprising said $n^{(1/2)} \times n^{(1/2)} \times l$ three dimensional volume and ϵ=user set tolerance on convergence and where: m is the number of pixels in each image b, n is the total number of possible transverse locations in which a light-switchable element may localized and l is the number of planes of images.

7. The method of claim 5, wherein said defining of said sensing array, said creating of said three dimensional image and said solving are performed on a field programmable gate array.

8. The method of claim 5, wherein said optics include a cylindrical lens.

* * * * *